US008581851B2

(12) United States Patent
Pienimaa et al.

(10) Patent No.: US 8,581,851 B2
(45) Date of Patent: Nov. 12, 2013

(54) METHOD AND DEVICE FOR CHARACTER INPUT HAVING A BASE CHARACTER COMPONENT AND A SUPPLEMENTAL CHARACTER COMPONENT

(75) Inventors: Seppo Pienimaa, Espoo (FI); Kong Qiao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 184 days.

(21) Appl. No.: 12/678,334

(22) PCT Filed: Sep. 24, 2007

(86) PCT No.: PCT/EP2007/008276
§ 371 (c)(1),
(2), (4) Date: Aug. 2, 2010

(87) PCT Pub. No.: WO2009/039870
PCT Pub. Date: Apr. 2, 2009

(65) Prior Publication Data
US 2010/0302164 A1    Dec. 2, 2010

(51) Int. Cl.
G06F 3/02    (2006.01)
G06F 3/041    (2006.01)
G09G 5/00    (2006.01)

(52) U.S. Cl.
USPC .......................... 345/171; 345/168; 345/173

(58) Field of Classification Search
USPC .................................. 345/156–184; 715/863
See application file for complete search history.

(56) References Cited

U.S. PATENT DOCUMENTS

| 5,956,021 | A | * | 9/1999 | Kubota et al. .................. 345/173 |
| 2004/0229663 | A1 | | 11/2004 | Tosey et al. ................. 455/575.1 |
| 2006/0227100 | A1 | | 10/2006 | Kun et al. |
| 2006/0290656 | A1 | * | 12/2006 | Soong et al. .................. 345/156 |
| 2007/0070045 | A1 | * | 3/2007 | Sung et al. .................... 345/173 |
| 2007/0146340 | A1 | * | 6/2007 | Webb ............................ 345/173 |
| 2008/0297480 | A1 | * | 12/2008 | Lee ............................... 345/169 |

FOREIGN PATENT DOCUMENTS

| KR | 20060052044 A | 5/2006 |
| WO | 2007040378 A | 4/2007 |
| WO | WO 2007040378 A1 * | 4/2007 |

OTHER PUBLICATIONS

"International Search Report and the Written Opinion of the International Searching Authority", received in corresponding PCT Application No. PCT/EP2007/008276, Dated May 23, 2008, 13 pages.
Office Action received in corresponding Chinese Patent Application No. 200780100781.X, dated May 11, 2011, 13 pages.
Office Action received in corresponding Korean Application No. 2010-7008865, dated Aug. 29, 2011, 9 pages.

* cited by examiner

*Primary Examiner* — Bipin Shalwala
*Assistant Examiner* — Ryan A Lubit
(74) *Attorney, Agent, or Firm* — Harrington & Smith

(57) ABSTRACT

A device which has a display, a memory, a processor and a first input and a second input. The device is configured to receive input through said first corresponding to a base character component and to receive input through said second corresponding to a supplemental character component. The supplemental character component and the base character component are thereby combined to form a character input.

20 Claims, 8 Drawing Sheets

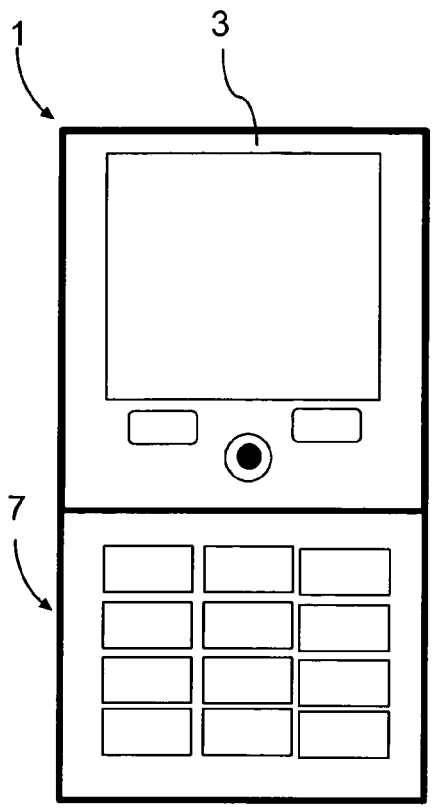
FIG. 4a
FIG. 4b
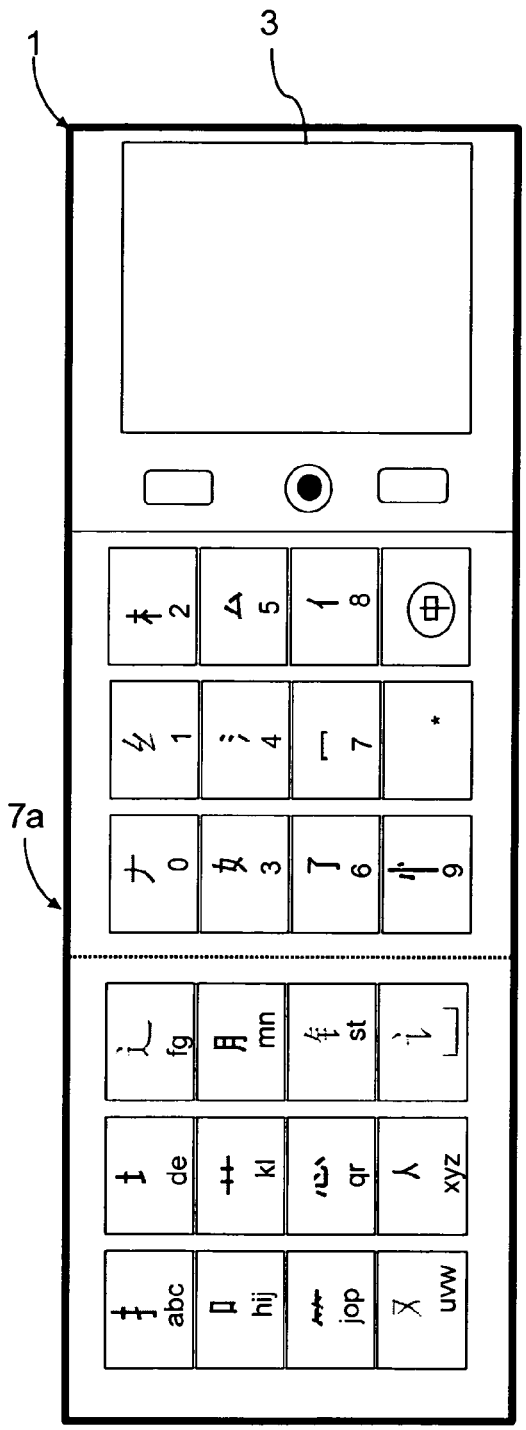
FIG. 4c

METHOD AND DEVICE FOR CHARACTER INPUT HAVING A BASE CHARACTER COMPONENT AND A SUPPLEMENTAL CHARACTER COMPONENT

RELATED APPLICATION

This application was originally filed as PCT Application No. PCT/EP2007/008276 filed Sep. 24, 2007.

The present application relates to a device and a method adapted for text input using a keypad and a touchpad. In particular the application relates to a mobile phone and a method adapted for combined text input using a keypad and a touchpad simultaneously.

BACKGROUND OF THE INVENTION

Many contemporary devices having text input capabilities such as computers, portable and stationary, personal digital assistants, mobile communication terminals use one of or both of a so-called QWERTY (or AZERTY) keyboard or a 12-key keypad commonly referred to as an ITU-T keypad. The structure layout of a QWERTY or ITU-T keyboard was originally designed for Latin characters, it is not efficient for many local Asian languages, due to either the ideographic structures of them, e.g., Chinese, Japanese, Korean, etc, or too many letters involved, e.g., Hindi (includes more than 60 letters). Hence, diverse finger or pen input methods and user interfaces (UI) have been proposed for local Asian language scripts input. The idea is that the acquired character strokes written with finger or pen on the touch screen or touchpad are sent to be recognized with the integrated HWR (handwriting recognition) engine, and then the recognized result (normally a list of character candidates) is shown on screen for users to make selection. As it is very difficult for a HWR engine to ensure a 100% first-hit recognition rate, once the first hit in the recognition candidate list is the target one which the user writes, the user has to find the right one from the rest candidates in the list, or even write the character again. This is actually quite time consuming, and tedious. Other systems, such as Pinyin input, uses the keypad to input non-Latin languages by associating the various keys with the character or characters that sounds most like the non-Latin counterpart. This can sometimes be difficult to learn as the sounds vary for dialects and sometime there is no clear counterpart.

DISCLOSURE OF THE INVENTION

On this background, it is an object of the present application to provide a device that overcomes or at least reduces the drawbacks indicated above.

This object is achieved by providing a device having a display, a memory, a processor and a first input and a second input, wherein said device is configured to receive input through said first input corresponding to a base character component, to receive input through said second input corresponding to a supplemental character component, and to combine said supplemental character component with said base character component to form a character input.

In one alternative device said first input is a keypad and in one alternative device said second input is a touchpad.

By providing input of a base character component from a standard selection and then supplementing it with touchpad input it is both easy for a Hand Writing Recognition engine to recognize the characters being input as it gets the base character component for free and at the same time easy for the user to learn and use as it is quite intuitive to first input a base as displayed on the keys and then supplementing it with touchpad input to resemble the character wanted. This also lowers the requirement for quality in the input and makes it useful in shaky environments such as underground trains and a like.

Naturally it should be understood that any type of touch input means would work for implementing the teachings of this application.

The device may be further configured to recognize to which of at least one character stored in a memory of said device, said character input corresponds to. This would allow the device to switch the input character to one already stored and coded in the memory and use it on various applications such as text editing, message handling, phonebook, web browsing and gaming.

The device may be further configured to predict a supplemental character from said character input. Using a prediction scheme an even faster and more intuitive input can be provided.

The device may be further configured to display said predicted supplemental character component on said display. This would make it easy for a user to select the predicted results, especially if more than one is possible, and to keep control of the prediction.

The device may be further configured to combine said supplemental character component with said base character component to form a character input once a timeout value has been reached. Using a timeout provides for omitting one clicking or typing action, ie the actual accepting of a character. Should the timeout lapse and the character is not recognized the user will be notified of this and given an opportunity to correct or amend.

Other possible ways of accepting are clicking an icon on display, accepting using a softkey, using special keypad command such as a space character or a punctuation character or entering a new base character component.

The device may be further configured to edit said base character component. If the base character can be edited it is easier to either make it look more like the character wanted to be input. This can be done by any one or more of the following actions: moving, deleting, partial deleting, copying, mirroring, rotating or pasting. A partial deleting is simply that a part of the base character component is deleted. A move could be used to make more space for a second base character component or to align two components with respect to each other. Mirroring is to simply mirror the component. Mirroring can be either vertical or horizontal.

The device may be further configured to receive further input through said first input corresponding to a further base character component, and to combine said further base character component with said character input. This would allow a user to combine one or more base character components. Naturally this further base character component is also editable.

The device as above wherein said second input or touchpad and said display are the same in the form of a touchscreen.

The above mentioned object may also be achieved by a method for creating a character, said method comprising receiving input through said keypad corresponding to a base character component, receiving input through said second input corresponding to a supplemental character component, and combining said supplemental character component with said base character component to form a character input. The advantages of this method are similar to those of the device as described above.

The method may further comprise recognizing at least one character to which said character input corresponds to.

The method may further comprise predicting a supplemental character from said character input.

The method may further comprise displaying said predicted supplemental character input on a display.

The method may further comprise combining said supplemental character component with said base character component to form a character input once a timeout value has been reached.

The method may further comprise editing said base character component.

The method as above wherein said editing can include any one or more of the following actions: moving, deleting, partial deleting, copying, mirroring, rotating or pasting.

The method may further comprise receiving further input through said keypad corresponding to a further base character component, and combining said further base character component with said character input.

The method may further comprise using said character input in any one or more of the following applications text editing, message handling, phonebook look-up, web browsing and gaming.

The above mentioned object is also achieved by providing a computer readable medium including at least computer program code for controlling a device comprising a display, a memory, a processor and a first input and a second input which device is provided with software code for receiving input through said first input corresponding to a base character component, software code for receiving input through said second input corresponding to a supplemental character component, and software code for combining said supplemental character component with said base character component to form a character input. In one alternative device that is controlled by this software said first input is a keypad and in one alternative device said second input is a touchpad.

As some alphabets have many possible characters that do not resemble each other it can be difficult to choose which base character components to use. Too many and the keypad gets too large, and too few requires a lot of editing or supplementing. It is thus an object of the application to provide a device being small yet offering many key functionalities.

This object is achieved by providing a device having a first input and a second, wherein said first input has two parts, one base part and one fold part rotatably attached to each other to be able to obtain two positions, one open and one closed and wherein said base part has one first input area on a side substantially residing in the same plane as said second input and said fold part has a second input area on one side and a third input area on an opposite side to the side having said second input are so that in said closed position said first and second input areas are facing each other and inaccessible and in said open position said first and third input areas are positioned adjacent each other facing the same direction, both being accessible. By having a foldable first input more base character components are able to be put on the same are without the device growing considerably in size. In one alternative device the first input is a keypad and the input areas are key areas and in one alternative device the second input is a touchpad.

An alternative is the device as above wherein said touchpad is a touch screen. By having the touchpad being a touch screen more space can be saved as there is no longer any use of having separate touchpad and display.

These objects are also achieved by providing a device having display means, memory means, processor means and key-input means, touch-input means, and combination means arranged to combine a base character component received through said key-input means with a supplemental character component received through said touch-input means to form a character input.

Further objects, features, advantages and properties of the touchpad, method and computer readable medium according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIGS. 4*a*-4*c* are plane front views of a device according to an embodiment adapted for Chinese input.

DETAILED DESCRIPTION OF PREFERRED EMBODIMENTS

In the following detailed description, the device, the method and the software product according to the teachings for this application in the form of a cellular/mobile phone will be described by the embodiments. It should be noted that although only a mobile phone is described the teachings of this application can also be used in any electronic device and preferably in portable electronic devices such as laptops, PDAs, mobile communication terminals, electronic books and notepads and other electronic devices utilizing text input.

Figure 1:
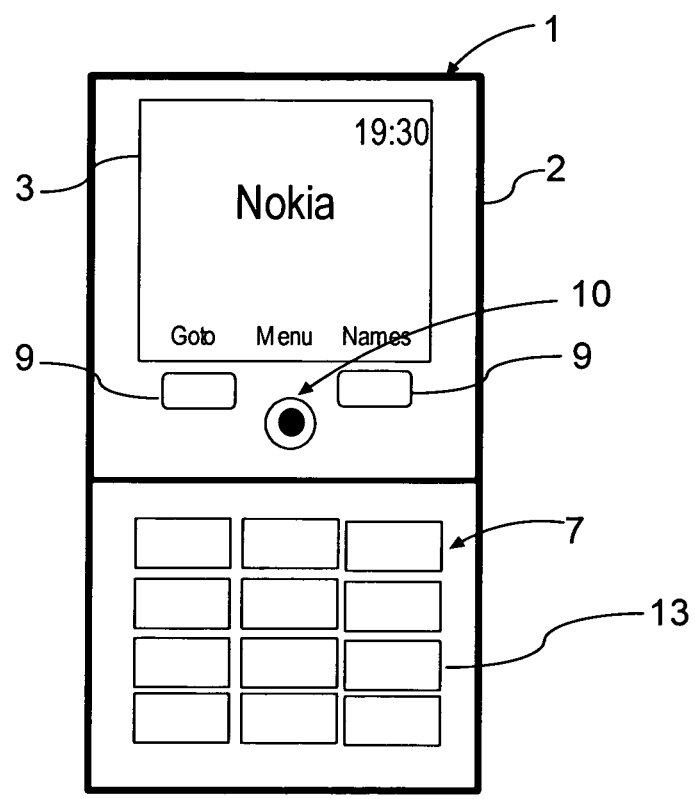
FIG. 1 is a plane front view of a device according to an embodiment.
Figure 2:
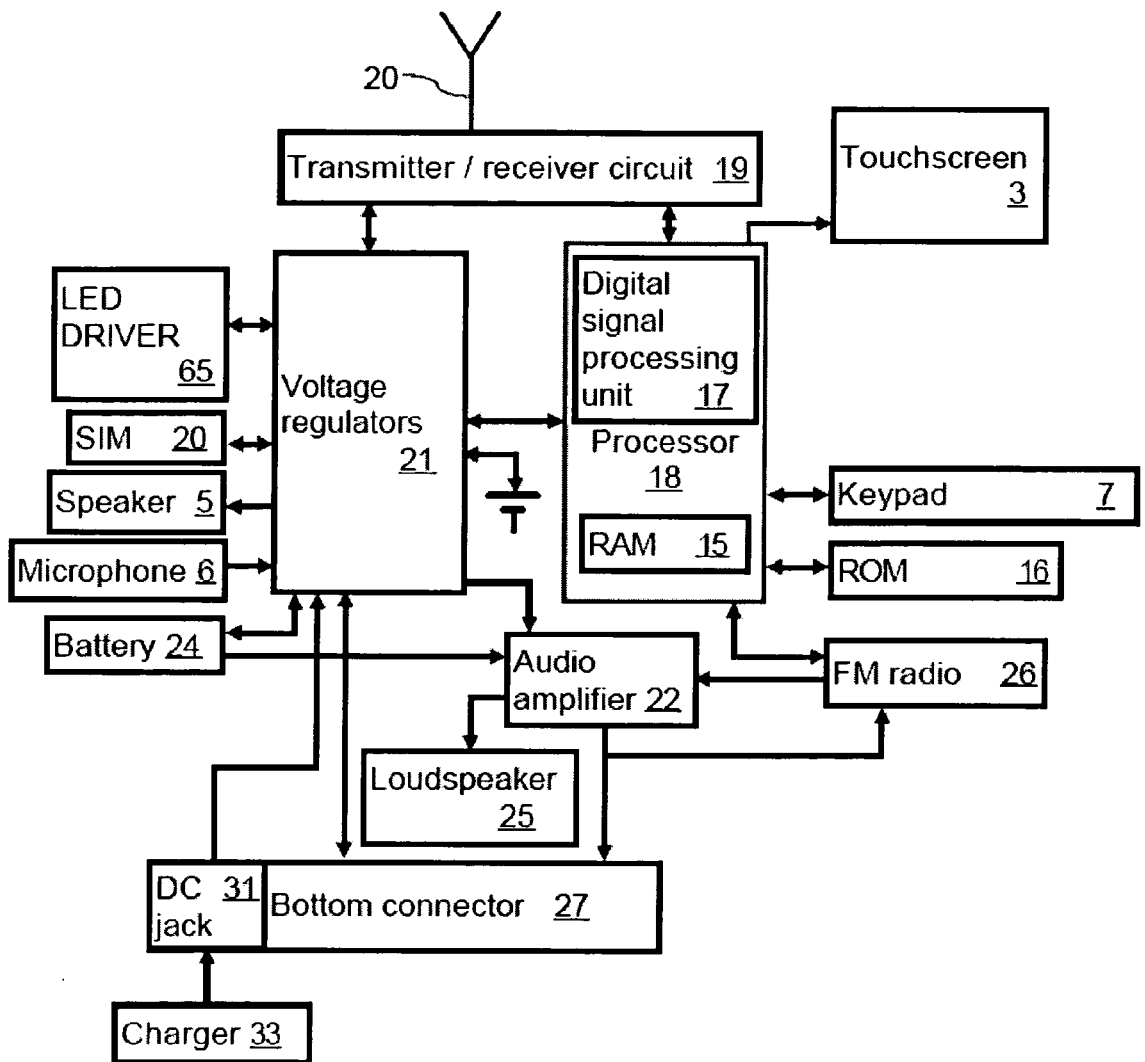
FIG. 2 is a block diagram illustrating the general architecture of a device of FIG. 1 in accordance with the present application.

FIG. 1 illustrates an embodiment of a device in the form of a mobile telephone 1 by a front view. The mobile phone 1 comprises a user interface having a housing 2, display or screen possibly being a touch screen 3, a mechanical on/off button (not shown), a speaker 5 (FIG. 2), and a microphone 6 (FIG. 2). The phone 1 according to the first preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

Non vocal user input is mainly via a second input or touch screen 3 or a conventional display screen 3, a first input or keypad 7 with discrete mechanical keys 9,10, and 13. The flat display 3 is typically made of an LCD with back lighting, such as a TFT matrix capable of displaying color images.

The keys 9, 10 & 13 are used for, for example, dialing phone numbers or entering text The keypad 7 includes a four-way navigation plus select key 10 that is used for navigation and for selection of the function indicated in the label in the display screen 3 above the navigation key 10, the left soft key 9 and the right softkey 9 that are used for selecting function indicated in the respective label in the display screen 3 above the soft keys 9. Call handling is performed with an off hook key 11 for accepting incoming calls and for initiating a new call and the on hook key 12 is used for rejecting incoming calls and for ending ongoing calls. The labels above the soft keys 9 and above the navigation key 10 are adapted to the current mode of the phone.

FIG. 2 illustrates in a block diagram form the general architecture of a device 1 constructed in accordance with the present application. The processor 18 controls the operation of the terminal and has an integrated digital signal processor 17 and an integrated Random Access Memory (RAM) 15. The processor 18 controls the communication with the cellular network via the transmitter/receiver circuit 19 and an internal antenna 20. A microphone 6 coupled to the processor 18 via voltage regulators 21 transforms the user's speech into analogue signals, the analogue signals formed thereby are A/D converted in an A/D converter (not shown) before the speech is encoded in the Digital Signal Processor (DSP) 17 that is included in the processor 18. The encoded speech signal is transferred to the processor 18, which e.g. supports the GSM terminal software. The digital signal-processing unit 17 speech-decodes the signal, which is transferred from the processor 18 to the speaker 5 via a D/A converter (not shown). Various applications are stored in the memory 15 or 16 and are executed by the processor 18. Such applications can be message handling, web browsing, call handling, text editing and gaming. Other applications might be internal such as Hand Writing Recognition applications commonly referred to as HWR engines.

The voltage regulators 21 form the interface for the speaker 5, the microphone 6, the LED drivers 65 (for the LEDS backlighting the keypad 7, and in some embodiments below the touchpad), the SIM card 20, battery 24, the bottom connector 27, the DC jack 31 (for connecting to the charger 33) and the audio amplifier 33 that drives the (hands-free) loudspeaker 25.

The processor 18 also forms the interface for some of the peripheral units of the device, including a Flash Read Only Memory (ROM) 16, the touch screen 3, the mechanical keypad 7, and an FM radio 26.

Upon various events in the mobile phone 1 the mobile phone generates a signal to inform the user of the event. Examples of such events are incoming messages, incoming phone calls, a warning for low battery level, a download being completed, and any other events that the user may wish to be informed about. The signal may have an audible and/or vibrational and/or visual form. For example an incoming call is signaled by a ringing tone in combination with a vibration signal. In an embodiment the form of signaling for the respective events is user adjustable. These settings may be individually set or by using groups of settings that are generally referred to as profiles.

FIG. 3 illustrates embodiments by means of flowcharts. Starting with FIG. 3a in the first step 300 the device receives inputs from a first input, in this case a keypad 7, this input is then used to find the base character component in step 305. This can easily be done by allocating various base character components to each key on the keypad 7 where by pressing one key 13 provides the key input corresponding to the allocated base character components in step 300. The base character component is then displayed on said display 3. Thereafter input through a second input, in this case a touchscreen 3, is received in step 315. This input is most commonly generated by either a stylus or a finger stroke on the touchscreen 3. In step 320 the corresponding supplemental character components is found. This can either be done by simply using the graphical representation of the stroke made on the touchscreen 3 or through a selection of available elements previously displayed on the touchscreen 3. If a graphical or drawing input is used it could either be freehand, allowing the user to draw as he pleases, or locked, ie steering the input to certain fixed positions or vectors which would make the system more easy to use in shaky environment. As a indicated by the dashed line that the step of receiving such input in step 315 and finding the supplemental character component 320 can be repeated to provide further supplemental character components. These two steps 315 and 320 always go together so they could be put in an encompassing step 335 of supplementing. The base character components and supplemental character component(s) are then combined in step 325 to form a character input which is sent to a handwriting recognition engine or other text input engine for further use. The comparison itself consists of two main steps, a combination step and a comparison step. The combination step is basically combining the base character component to the image data of the supplemental character component. This can be done using commonly known imaging techniques. The next step is then to compare to known characters which can be done by an image comparison. If a system with either prediction (as to be explained below) or steered touch input the combined character components do not consist of graphical data as such and other comparison techniques such as binary tree, Huffmann coding or other known searching techniques of available characters can be used. It should be noted that a character input, or a complete character could be generated from one or more base characters in combination with one or more supplemental character components and that a base character component could also be used as a supplemental character component.

Figure 3A:
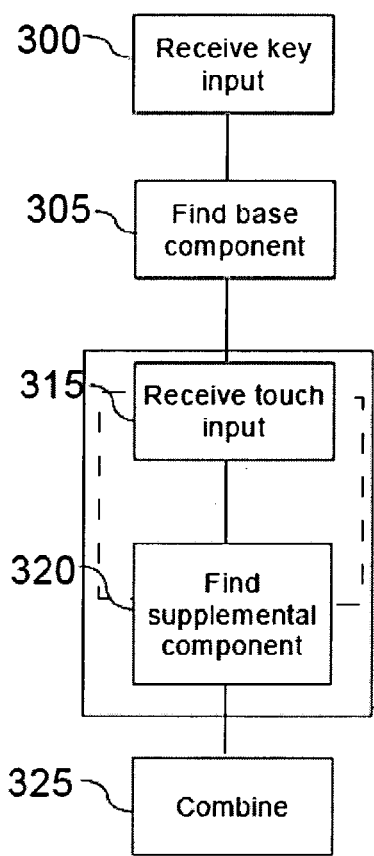
FIG. 3*a-d* are flow charts of a method according to an embodiment.
Figure 3B:
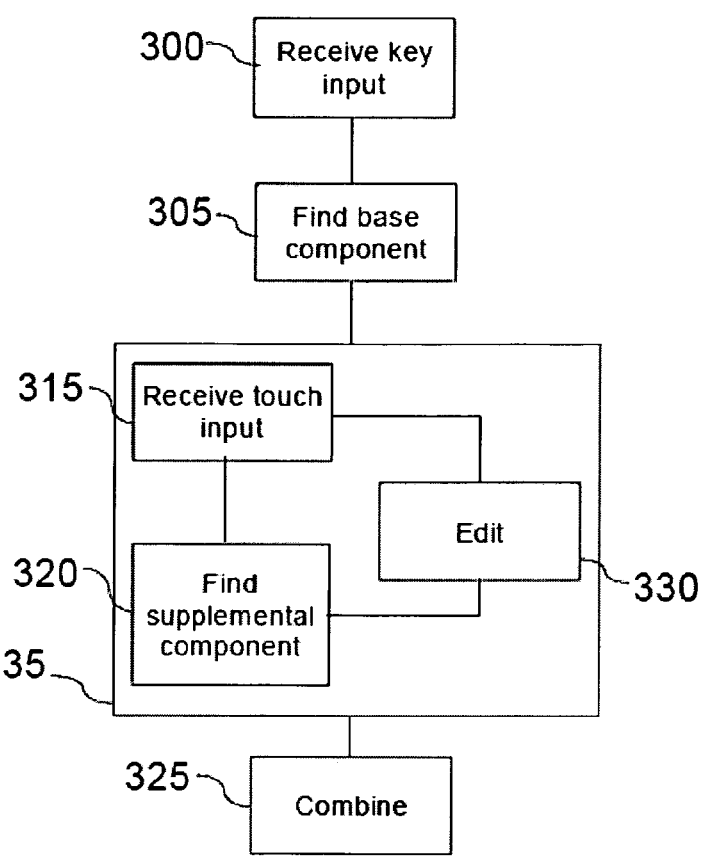

In FIG. 3b an additional step 313 of editing the base character components or a combination of a base character component and one or more supplemental character components is introduced. Editing can be done by either moving, deleting, partial deleting, mirroring, rotating, copying or pasting. These editing actions can either be done by touch input, such as drag and drop, or by using the mechanical keys. For example a move action could be implemented as such: the base character component is selected for editing by default (the last generated component could be selected by default and/or a toggle switch could be used to toggle between the various components) and then moved by using the four-way navigation key 10 (or joystick 10) or any other directional input. The selected component could be marked either by changing its borders (dashed or dotted lines, thicker lines or different colors) or by placing a frame around it so that the user can easily see which component is currently selected for editing. Any editing commands, such as pen strokes through the touch input, in the other areas are interpreted as either predefined commands or supplementary character component inputs. The editing and receiving of touch input are circular or parallel actions and from now on referred to as a step of supplementing 335 that continues until the combination in step 325 is done.

Figure 3C:
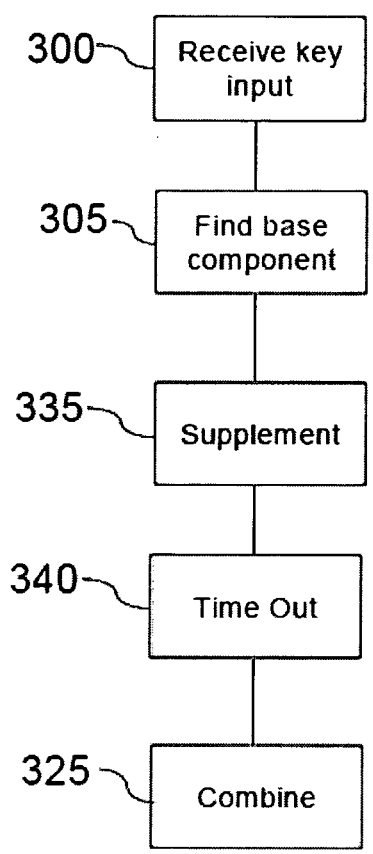

In FIG. 3c a further step 340 has been introduced off to the supplementing 335 and combination 325. This further step 340 introduces the timeout value giving the user a certain time to complete his character or rather giving a timeout value which is mentioned from the last input and often which has elapsed the character components are sent to the combination step. Introducing a timeout makes it possible to omit a step of accepting the character components before combining them thus possibly saving one key press per character.

Figure 3D:
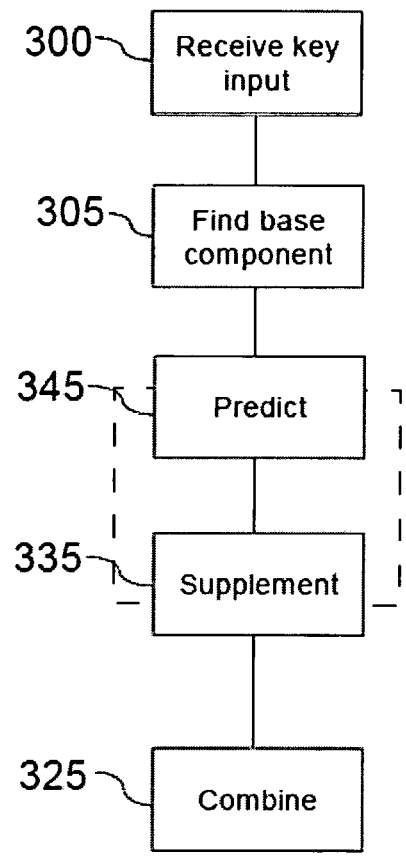

In FIG. 3d a further step 345 of predicting has been introduced. In this step the base component is compared to a dictionary stored in the memory 15 or 16 of the device to find possible resulting candidate characters. This comparison can be made in a number of ways commonly known to persons skilled in the art of handwriting recognition or image recognition. As a candidate for the resulting character is found the differences between the base character components and the resulting character are identified as candidates for supplemental character components. These candidates for supplemental character components may then be displayed to the user either on their corresponding place on the already input base character components or in a list next to it. These candidates can either be displayed by using various colors or different bass lines which could also help differentiate between candidate supplemental character components for various candidate characters. The candidate supplemental character components can then be selected by clicking with either a pen or finger on the touchpad this would then constitute the touch input which provides the supplemental character component. This will be further described below. Alternatively the complete candidates are displayed on the display for a quick, however limited, selection. As is indicated by the dashed line the actions of supplementing 335 and predicting 345 can be repeated as the input supplemental character components may produce different predicted candidates.

The various aspects of what is described above can be used alone or in various combinations. The teaching of this application is preferably implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs) or any other device having a limited input system and used for or using text input.

The teaching of this application has numerous advantages. Different embodiments or implementations may yield one or more of the following advantages. It should be noted that this is not an exhaustive list and there may be other advantages which are not described herein. One advantage of the teaching of this application is that a smaller keyboard can be used while still allowing very fast input of characters belonging to a large and complex alphabet.

Another advantage of the teaching of this application is that it is easy to learn. A user simply types in the base character component most resembling the character through the keys 13 and then adds strokes using the touchscreen 3 which makes it easy for the HWR engine to guess which character is being generated. Yet another advantage of the teaching of this application is that it does not require a great deal of precision from the user as the base character component is generated by the system and the strokes are then easy to add which makes it easy to use in a shaky environment as the user is not required to draw complicated figures for the HWR engine to be able to interpret them correctly.

As some alphabets, such as the Chinese, have a lot of possible characters that do not resemble each other it can be difficult to choose which base character components to use. Too many base character components and the keypad gets too large and the device is cumbersome and clumsy for a user to carry in for example a shirt pocket or small handbag, and too few requires a lot of editing or supplementing of the base character component to be quick to use and to provide results that are easy to recognize for the HWR engine.

FIG. 4 shows a device that overcomes this problem. Even though the device is shown as a mobile phone it should be understood that the same concept can also be applied to other devices such as other mobile communication terminals, PDAs, laptops or other electronic devices using text input. The device 1 in FIG. 4a has a screen 3 which is a touchscreen or a touch display 3 serving as a second input and a first input, in this case a keypad 7, which in this case is an ITU-T keypad having 12 keys. In FIG. 4b it is shown that the keypad 7 is foldable and when opened reveals a second keypad 7a. FIG. 4c shows the device fully opened and revealing the size of keypad 7a. In this manner many more base character components can be made available for a user. As can also be seen from FIG. 4c the second keypad 7a has keys representing both base character components and the commonly used multi-character keypad representation of the Latin alphabet as well as the Arabic numerals thus providing for text input using both the Latin characters and another alphabet as discussed above.

Figure 5A:
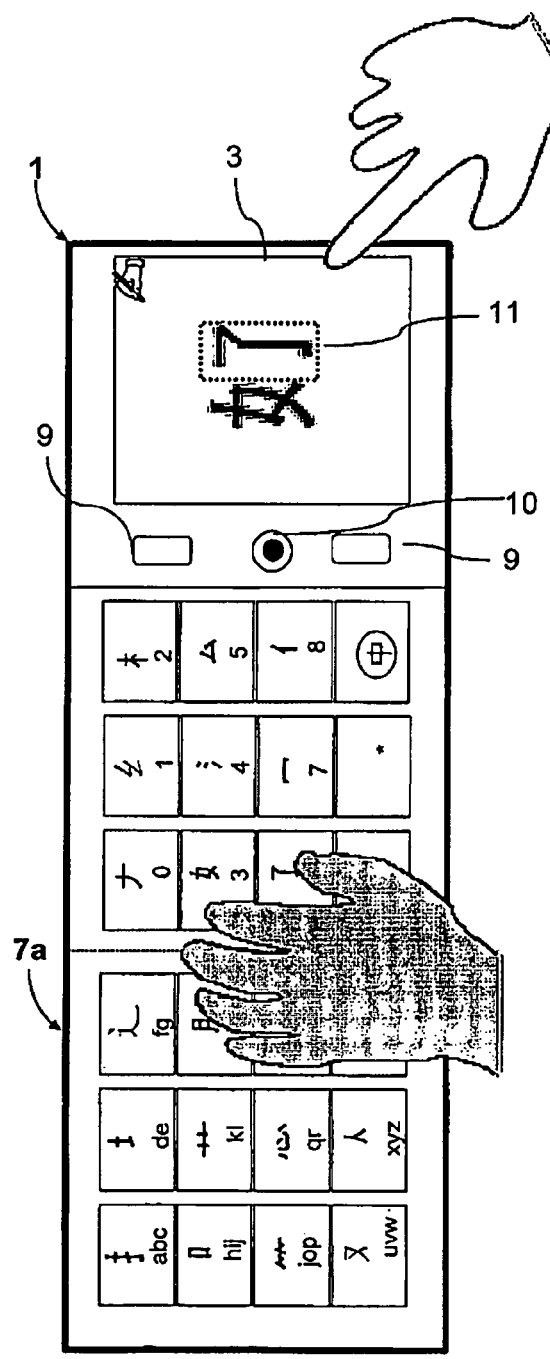
FIGS. 5*a*-5*b* are plane front views of a device according to an embodiment showing a creation of a character.
Figure 5B:
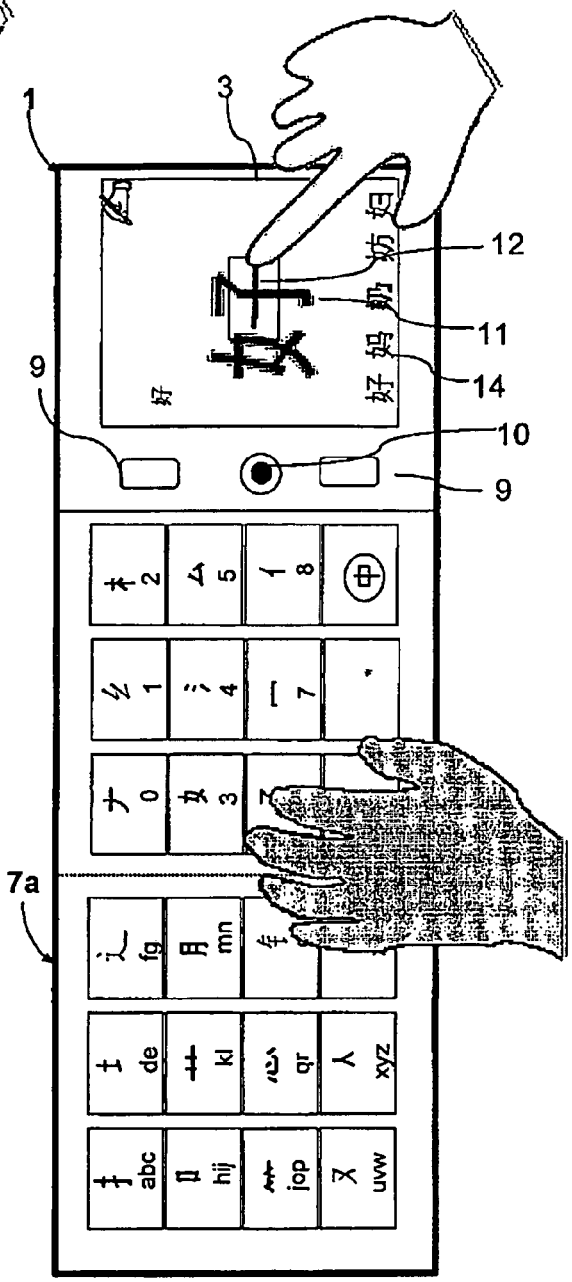

FIG. 5 shows a device 1 having a keypad 7a adapted for Chinese and a touchscreen or touch display 3 as shown in FIG. 4c along with two softkeys 9 and a four-way navigation key 10. In FIG. 5a a user is typing in base character components using his left hand. In FIG. 5a user has pressed the key with Latin marking "6" and the resulting data character component 11 is displayed on the touch display 3 next to a previously input base character component. The data character component 11 is surrounded by a dotted line indicating that the data character component 11 is selected for editing. Other ways of marking this could be having dashed lines, different colors, different line thicknesses or using shadowing techniques. In FIG. 5b the user inputs a supplemental character component 12 using his finger of his right hand. The data character component 11, the supplemental character component 12 and a previously entered character components are combined and used in the target application. Alternatively, a predictive input scheme can be used to which the two base character components can be sent to. In the FIG. 5b the two base character components have already been sent to the prediction engine and the resulting possible candidates 14 are displayed in the bottom part of the touch display 3. Using a timeout the leftmost candidate character could be chosen as the result.

In an alternative embodiment, not shown, the predicted possible candidate characters are not displayed as in FIG. 5b, but the needed supplemental character components that are necessary to be input to complete the character are displayed adjacent to the base character component either in a list or at their actual positions in the resulting character. The user can then select the resulting character by selecting an indicated supplemental character component. If more than one candidate is possible to candidate supplemental character components can be displayed in various colors, different line thicknesses or with dashed or dotted lines. This can be done in several steps if there are many candidates by each step showing a most significant supplemental character component that is unique to a group of candidates characters, one for each group, thereby narrowing the complete set of candidates as a group is chosen by selecting its corresponding candidate supplemental character component. And in the next step dividing this group into smaller subgroups each having a unique supplemental character component. This is repeated until a complete character can be predicted or recognized. If it is difficult to find a unique character component several can be chosen at the same time.

Figures 6A, 6B:
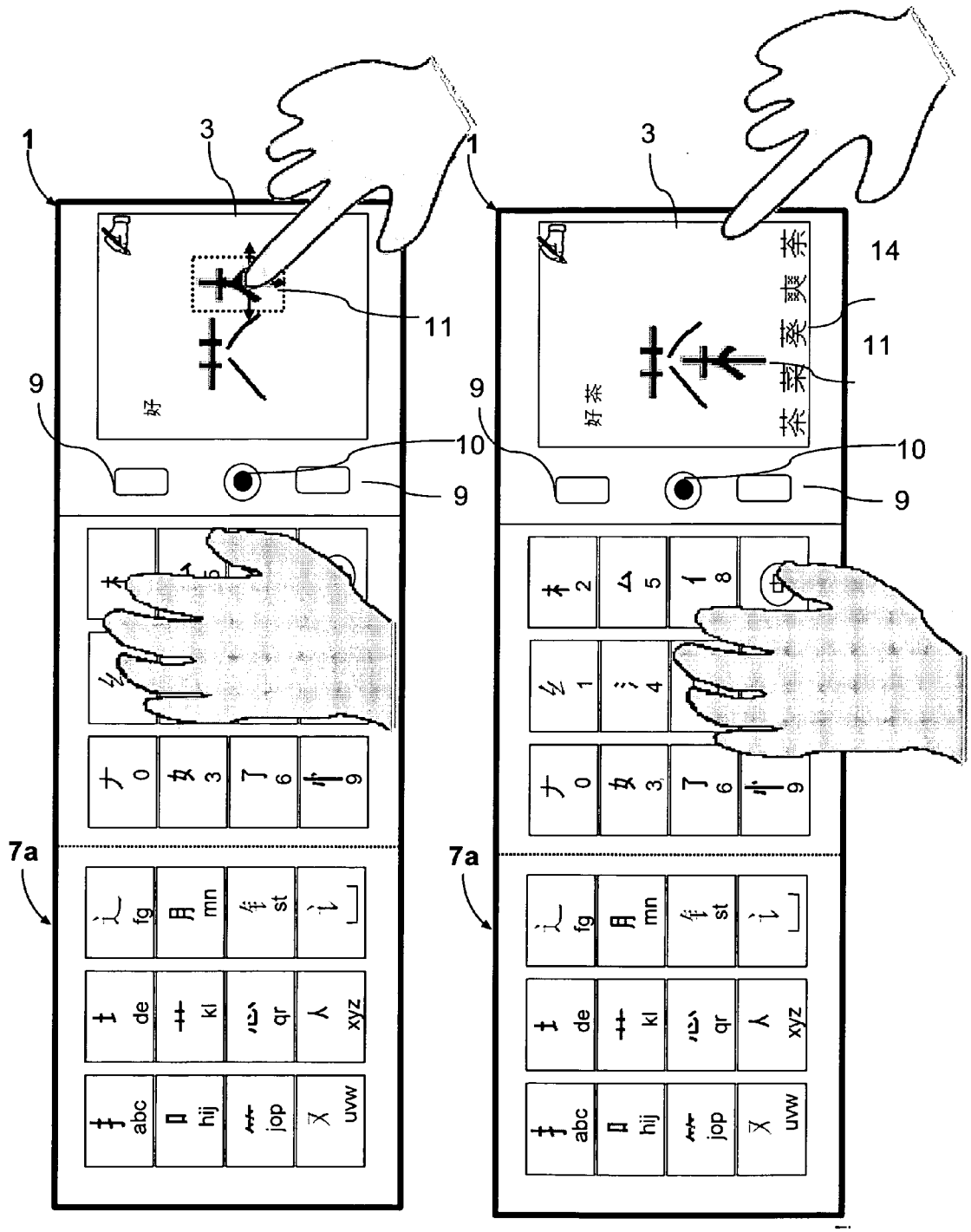
FIGS. 6*a*-6*b* are plane front views of a device according to an embodiment, showing an editing of a basic character component.

FIG. 6a shows the device 1 where user has input two base character components with two supplemental character components. The rightmost data character component 11 is to be moved, and the user does this by indicating by pressing for a long time with his finger on the base character component where upon the base character components can be indicated for moving as indicated in the figure with the arrows. Alternatively the move could be done by using the joystick 10 or four-way navigation key 10. FIG. 6*b* shows the two character components after the move has been completed. As can be seen the new prediction candidates 14 are displayed in the bottom part of the touch display 3.

Figure 7:
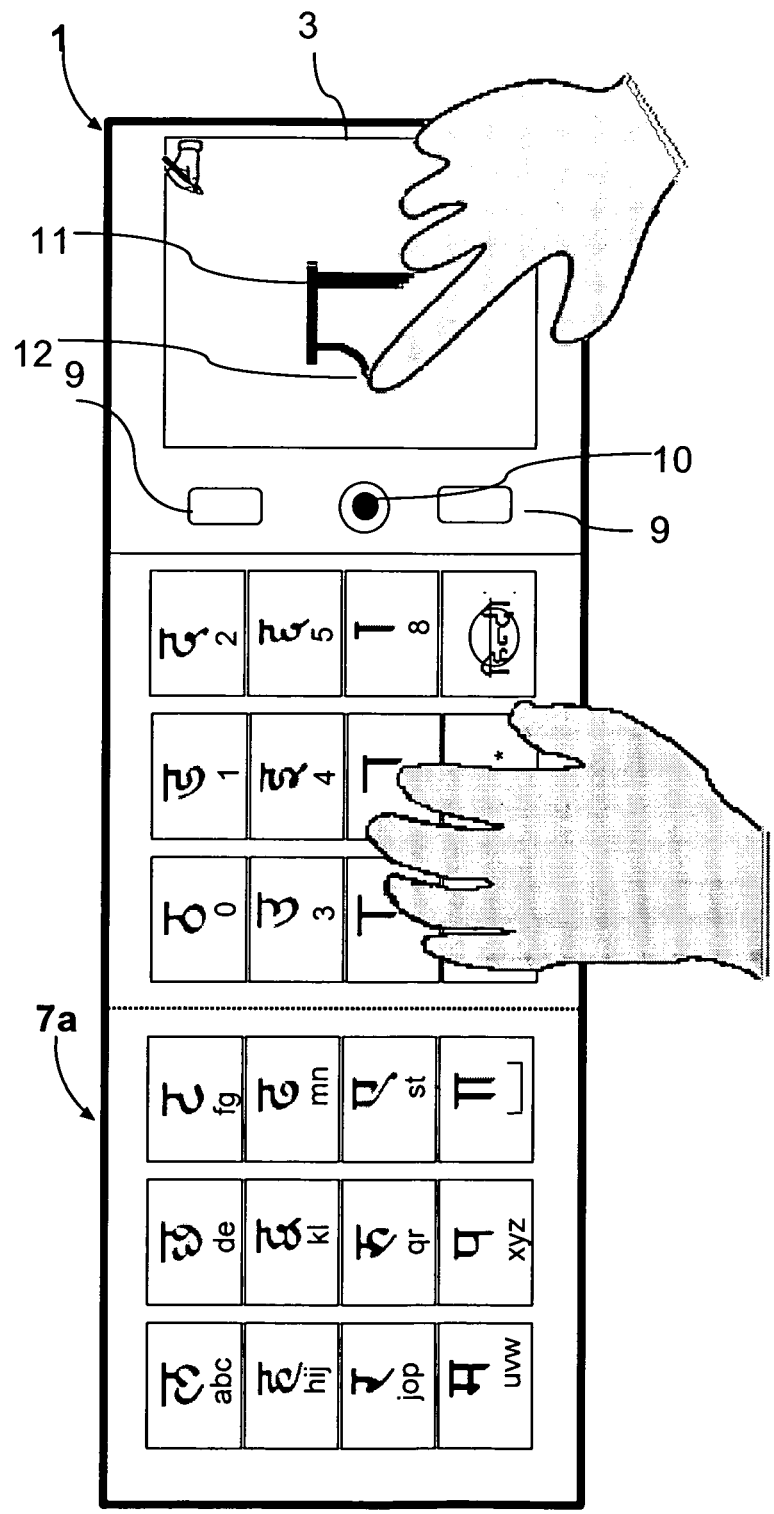
FIG. 7 is a plane front view of a device according to an embodiment adapted for Hindi input.

FIG. 7 shows a device 1 having a keypad 7*a* adapted for Hindi input where a base character component 11 has been input and supplemented with the supplemental character component 12.

It should be understood that also the smaller keypad 7 can be used for inputting base character components 11.

Although the teaching of this application has been described in detail for purpose of illustration, it is understood that such detail is solely for that purpose, and variations can be made therein by those skilled in the art without departing from the scope of the teaching of this application.

For example, although the teaching of this application has been described in terms of a mobile phone, it should be appreciated that the invention may also be applied to other types of electronic devices, such as cameras, video recorders, music players, palmtop computers and the like. It should also be noted that there are many alternative ways of implementing the methods and apparatuses of the teaching of this application. For example, although the touchpad or touchscreen 3 has been described in terms of being actuated by a finger, it should be noted that other objects may be used to actuate in some cases. For example, a stylus or other object may be used in some configurations of the touchpad.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A device comprising:
 a display,
 a memory,
 a processor,
 a first input, and
 a second input comprising a touchpad,
 said device being configured to receive input through said first input corresponding to a base character component,
 said device being configured to display the base character component on said display,
 said device being configured to subsequently receive input through said second input corresponding to a supplemental character component using a graphical representation of a stroke made on said touchpad, and
 said device being configured to combine said supplemental character component with said base character component by graphically merging the base and supplemental character components to form a single character input that is displayed.

2. A device according to claim 1, wherein said device is further configured to recognize to which of at least one character said character input corresponds to.

3. A device according to claim 1, wherein said device is further configured to predict a supplemental character from said character input.

4. A device according to claim 3, further configured to display said predicted supplemental character input on said display.

5. A device according to claim 1, wherein said device is configured to combine said supplemental character component with said base character component to form a character input once a timeout value has been reached.

6. A device according to claim 1, further configured to edit said base character component and:
 wherein said editing comprises one or more of moving, deleting, partial deleting, copying, mirroring, rotating and pasting.

7. A device according to claim 1 further configured to receive further input through said first input corresponding to a further base character component, and to combine said further base character component with said character input.

8. A device according to claim 1, further configured to use said character input in at least one of the following applications text editing, message handling, phonebook, web browsing and gaming.

9. A device according to claim 1 wherein said first input is a keypad.

10. A device according to claim 1, wherein said second input and said display are the same in the form of a touchscreen.

11. A method for creating a character, said method comprising:
 receiving input through a first input corresponding to a base character component,
 displaying the base character component on a display,
 subsequently receiving input through a second input, comprising a touchpad, corresponding to a supplemental character component, using a graphical representation of a stroke made on said touchpad, and
 combining said supplemental character component with said base character component by graphically merging the base and supplemental character components to form a single character input that is displayed.

12. A method according to claim 11, further comprising recognizing at least one character to which said character input corresponds to.

13. A method according to claim 11, further comprising predicting a supplemental character from said character input.

14. A method according to claim 13, further comprising displaying said predicted supplemental character input on the display.

15. A method according to claim 11, further comprising combining said supplemental character component with said base character component to form a character input once a timeout value has been reached.

16. A method according to claim 11, further comprising editing said base character component and wherein said editing includes one or more of moving, deleting, partial deleting, copying, mirroring, rotating and pasting.

17. A method according to claim 11 further comprising
 receiving further input through said first input corresponding to a further base character component, and
 combining said further base character component with said character input.

18. A method according to claim 11, further comprising using said character input in any one or more of the following applications text editing, message handling, phonebook, web browsing and gaming.

19. A method according to claim 11 wherein said first input is a keypad.

20. A non-transitory computer readable medium including at least computer program code for controlling a device comprising a display, a memory, a processor and a first input and a second input comprising a touchpad, said computer readable medium comprising:

software code for receiving input through said first input corresponding to a base character component, software code for displaying the base character component on the display, software code for subsequently receiving input through said second input corresponding to a supplemental character component, using a graphical representation of a stroke made on said touchpad, and software code for combining said supplemental character component with said base character component by graphically merging the base and supplemental character components to form a single character input that is displayed.

\* \* \* \* \*